United States Patent

[11] 3,535,965

| [72] | Inventor | Herman J. Baldwin<br>Cincinnati, Ohio |
|---|---|---|
| [21] | Appl. No. | 726,782 |
| [22] | Filed | May 6, 1968 |
| [45] | Patented | Oct. 27, 1970 |
| [73] | Assignee | The Cincinnati Milling Machine Co.<br>Cincinnati, Ohio<br>a corporation of Ohio |

[54] HOLD DOWN PLATE FOR USE WITH MATERIAL CUTTING MACHINE
10 Claims, 5 Drawing Figs.

[52] U.S. Cl. .................................... 83/129, 83/390, 83/459
[51] Int. Cl. .................................... B26d 7/06
[50] Field of Search ........................ 83/137, 144, 146, 111, 375, 390, 459, 461, 129; 30/275

[56] References Cited
UNITED STATES PATENTS
1,881,185  10/1932  Hazelton................  83/390
2,732,898  1/1956  Taylor....................  83/137
3,154,989  11/1964  Pearson et al..........  83/390
3,470,780  10/1969  Wright....................  83/375

*Primary Examiner*—James M. Meister
*Attorney*—Frank C. Leach, Jr.

ABSTRACT: A material cutting machine has an annular member for engaging the top of the material being cut to prevent lifting thereof when the material is cut by a reciprocating knife passing through the annular member. The annular member is mounted on a spherical joint of a movable hollow cylindrical member, which is continuously urged away from the material being cut by a plurality of springs so that the annular member is restrained from engaging the material being cut. Pneumatic pressure is employed to overcome the force of the springs and move the annular member into engagement with the material to prevent it from being lifted by the reciprocating knife during upward movement of the knife. The application of pneumatic pressure may be controlled, either manually or automatically, to cause reciprocation of the annular member relative to the material being cut.

Patented Oct. 27, 1970

INVENTOR.
HERMAN J. BALDWIN

BY
*Frank C. Leach Jr.*
HIS ATTORNEY

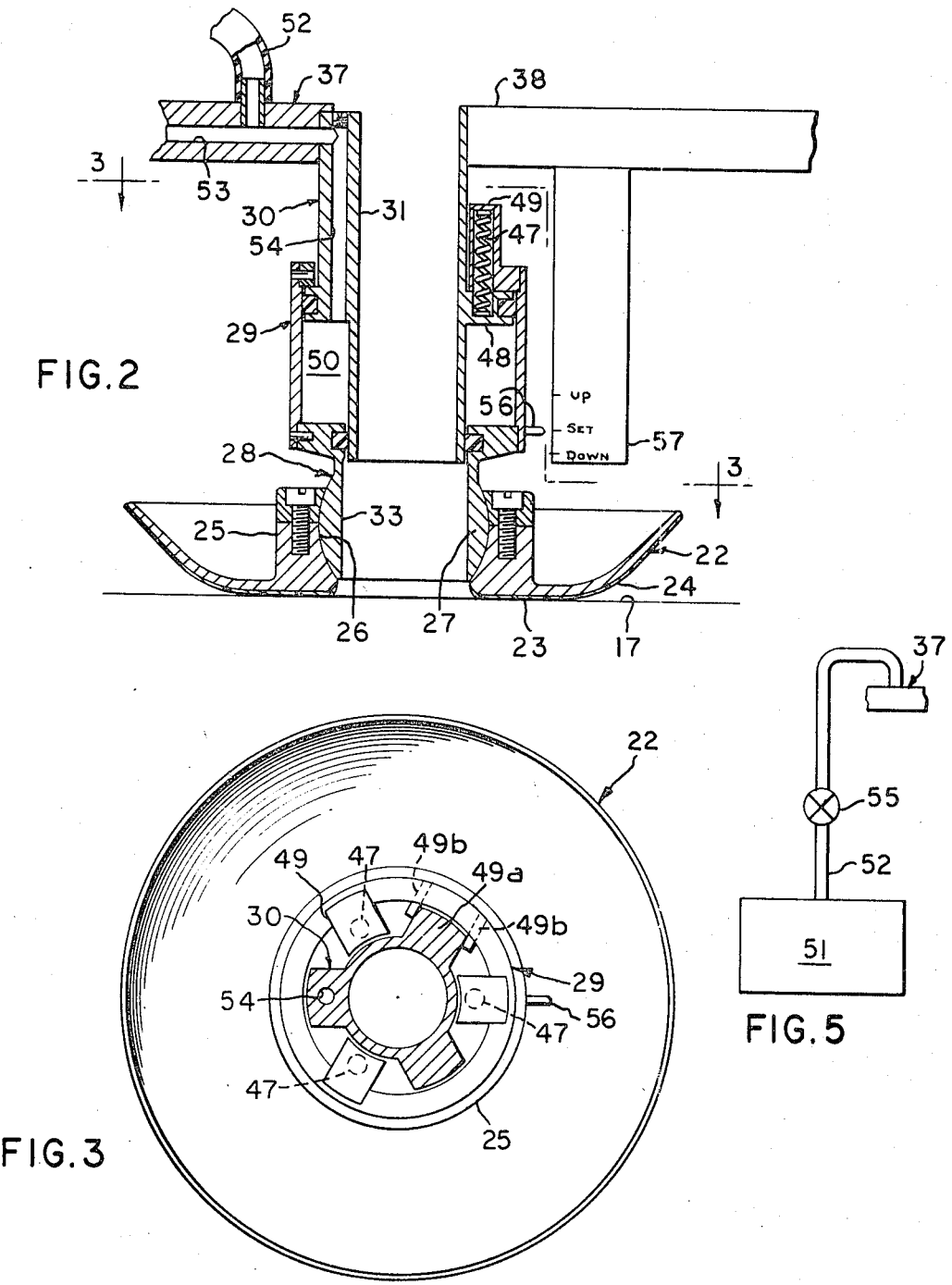

HOLD DOWN PLATE FOR USE WITH MATERIAL CUTTING MACHINE

In the material cutting machine of the type shown and described in the copending patent application of Edward C. Bruns for "Material Cutting Machine Having Reciprocating Cutting Blade With Two Axes Of Rotation," Ser. No. 726,658, filed May 6, 1968, and assigned to the same assignee as the assignee of the present application, the material is cut during both the up and down movements of the cutting blade. While suitable hold down structure is utilized to prevent relative movement between the various layers of material being cut such as the structure shown and described in the copending patent application of James G. Wiatt and Edward C Bruns for "Hold Down Apparatus For Material Cutting Machine," Ser. No. 636,968, filed May 8, 1967, and assigned to the same assignee as the assignee of the present application, this hold down structure is spaced slightly from the cutting blade. Accordingly, while the hold down structure of the aforesaid Wiatt et al., application satisfactorily prevents shifting of the layers of material during cutting, the upward cutting movement of the cutting blade of the aforesaid Bruns application may tend to lift the material adjacent the cutting blade.

The present invention satisfactorily overcomes this problem by utilizing a hold down plate, which is moved downwardly into engagement with the top of the material being cut by applying pneumatic pressure against the plate to exert a force on the material to prevent it from being lifted by the cutting blade during upward movement of the cutting blade.

Since the lifting of the material by the cutting blade during upward movement of the cutting blade will depend upon the type of material being cut, the thickness of each of the layers of the material being cut, and the total thickness of the material being cut, the downward force to be exerted by the plate on the material being cut may be varied. Thus, for example, a larger force may be required with a lightweight material to prevent lifting than will be required with a relatively heavy material. The present invention satisfactorily solves this problem by utilizing means to adjust the pneumatic pressure exerted on the plate to appropriately vary the downward force exerted by the plate on the top of the material being cut.

In some materials, the cutting force of the cutting blade may cause the material to tend to hump in addition to lifting. When the blade is just entering the material with only one of the hold down belts or bands of the aforesaid Wiatt et al., application in contact with the material, humping of the material may occur. Humping of the material also may occur when the blade makes a sharp turn due to the width of the cutting blade. The present invention has the hold down plate spherically mounted so that it may slide up or down with the material due to any irregularities or buckling in the material whereby humping of the material is prevented.

If the spherical mounting of the hold down plate should not permit the plate to move to release the material so as to prevent humping, the hold down plate may be fluttered or reciprocated with respect to the material by providing a pulsating supply of air to act on the hold down plate. Since springs are continuously urging the hold down plate away from the material, the pulsating air supply results in reciprocation of the hold down plate.

Humping of the material also may be created by air entering between the layers of material being cut. When the pulsating air supply is employed, the downward movement of the hold down plate of the present invention prevents the air from building up within the layers of material being cut. Thus, the hold down plate of the present invention not only prevents lifting of the material during upward movement of the cutting blade but also prevents humping of the material being cut.

An object of this invention is to provide a device to prevent material, which is being cut by reciprocating cutting means, from being lifted during upward cutting.

Another object of this invention is to provide a device to prevent any humping of the material being cut.

Other objects of this invention will be readily perceived from the following description, claims, and drawings.

This invention relates to a material cutting machine having means to support material thereon in a substantially horizontal plane for cutting and cutting means to cut the material supported on the material supporting means. The cutting machine has movable means adapted to move vertically relative to the top of the material with means continuously urging the movable means away from engagement with the material. The cutting machine has means to overcome the continuously urging means to move the movable means into engagement with the top of the material to exert a downward force thereon.

The attached drawings illustrate a preferred embodiment of the invention, in which:

FIG. 2 is an enlarged sectional view, partly in elevation, showing details of the pneumatic plate of the present invention;

FIG. 3 is a top plan view, partly in section, of a portion of the structure of FIG. 2 and taken along line 3–3 of FIG. 2;

FIG. 5 is a schematic view showing the connection between the compressor and the support of the pneumatic plate.

Figures 1, 4:
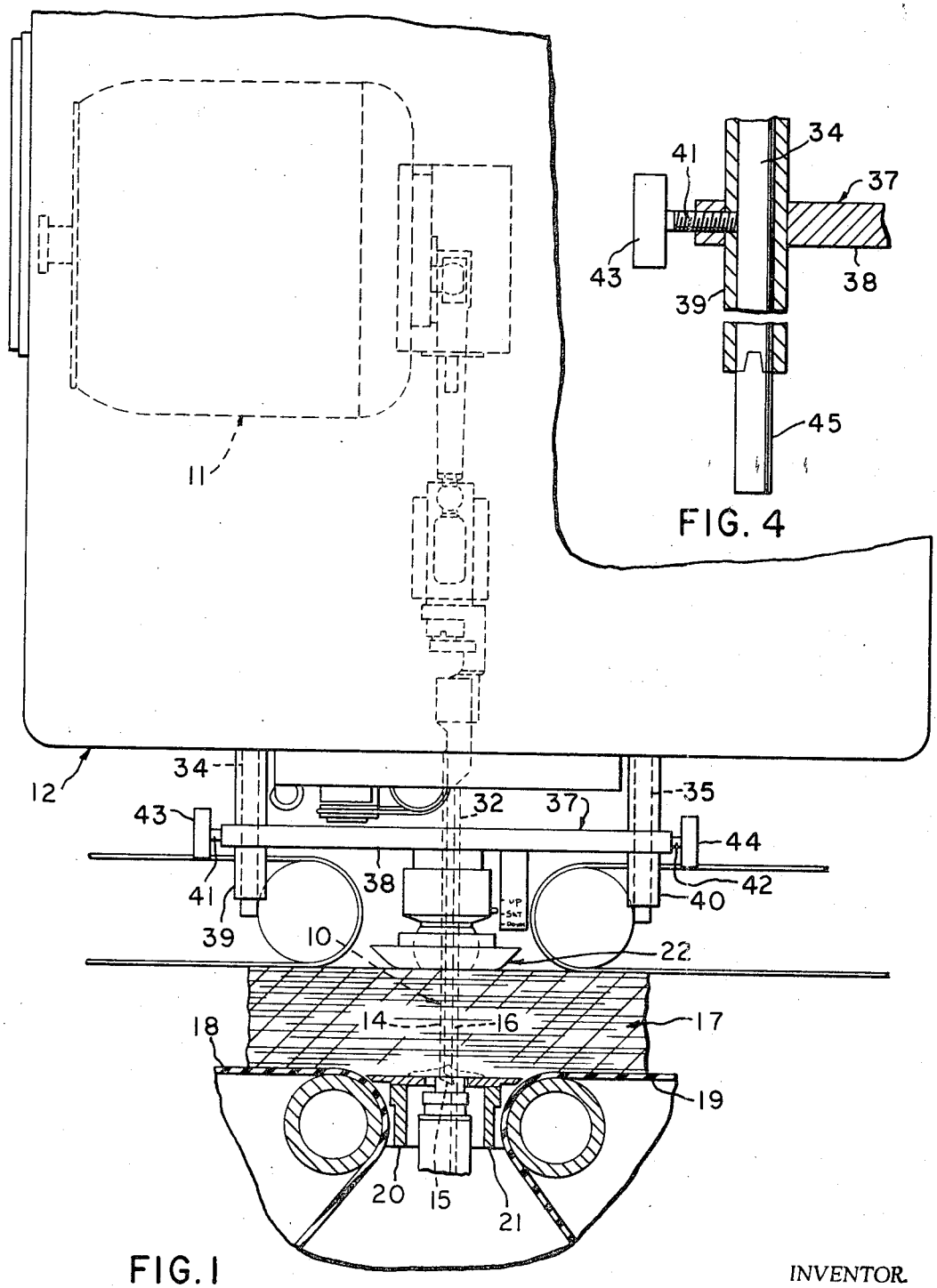
FIG. 1 is a side elevational view, partly in section, of a material cutting machine utilizing a pneumatic plate of the present invention.
FIG. 4 is an enlarged vertical sectional view of a portion of the support structure for the pneumatic plate of the present invention.

Referring to the drawings and particularly FIG. 1, there are shown portions of a material cutting machine of the type more particularly shown and described in the aforesaid Bruns application. The material cutting machine has a reciprocating cutting blade 10, which is adapted to be reciprocated by an electric motor 11 as more particularly shown and described in the aforesaid Bruns application.

The motor 11 is disposed within a housing 12 and is adapted to be moved vertically relative thereto as more particularly shown and described in the aforesaid Bruns application. The cutting blade 10 is adapted to be rotated relative to the motor 11 as more particularly shown and described in the aforesaid Bruns application.

The cutting blade 10 has its leading edge 14 and a bottom edge 15, which connects the bottom ends of the leading edge 14 and trailing edge 16, sharpened. Thus, as shown and described in the aforesaid Bruns application, cutting of material 17, which may be a plurality of layers of cloth, for example, occurs during both upward and downward movements of the cutting blade 10.

As more particularly shown and described in the aforesaid Bruns application, the material 17 is supported on endless bands 18 and 19 and throat way sections 20 and 21. The gap, which is formed between the throat way sections 20 and 21, may be closed as more particularly shown and described in the aforesaid Bruns application.

As shown in FIG. 2, the hold down plate of the present invention is preferably an annular member 22 having an inner flat portion 23 and an outer curved or spherical portion 24. The annular member 22 has an upstanding portion 25, which has an inner, spherical bearing surface 26.

The annular plate 22 is mounted on a lower spherical end 27 of a hollow member 28. Thus, there is a spherical joint between the member 28 and the annular plate 22 to permit the plate 22 to tilt up or down relative to the material 17, which is being cut. This also permits the annular plate 22 to rotate relative to the hollow member 28.

The hollow member 28 is fixedly secured to a hollow cylindrical member 29, which is slidably mounted on a hollow cylindrical member 30. The hollow cylindrical member 30 has a passage 31 extending therethrough of sufficient diameter to permit passage of the cutting blade 10 and its support rod 32 therethrough. The hollow member 28 has a passage 33, which has a larger diameter than the passage 31, to also permit the cutting blade 10 and the support rod 32 to pass therethrough.

The hollow cylindrical member 30 is adjustably connected to the housing 12. Accordingly, the position of the surface of the flat portion 23 of the annular member 22 is vertically movable with respect to the top of the material 17 being cut.

The connection between the housing 12 and the hollow cylindrical member 30 includes a pair of rods 34 and 35 (see FIG. 1), which extend downwardly from the housing 12. The rods 34 and 35 are secured to a grinding wheel frame (not shown), which is fixedly disposed within the housing 12.

A frame 37, which has the hollow cylindrical member 30 fixedly secured thereto, is slidable on the rods 34 and 35. The frame 37 includes a central portion 38 having hollow cylindrical supports 39 and 40 on opposite ends thereof. The hollow cylindrical supports 39 and 40 are slidably mounted on the rods 34 and 35, respectively.

The frame 37 is retained in the desired position relative to the material 17 through adjusting screws 41 and 42, which are carried by the central portion 38 of the frame 37. The adjusting screws 41 and 42 have knobs 43 and 44, respectively, to permit turning thereof. The screws 41 and 42 pass through openings in the supports 39 and 40 to engage the rods 34 and 35, respectively, to lock the frame 37 to the rods 34 and 35.

If the height of the material 17 is relatively small, it may be necessary to add additional extension rods (one shown at 45 in FIG. 4) to the lower end of each of the rods 34 and 35. The extension rods are necessary since fixed rods would engage the material 17 when the height of the material 17 was relatively high.

The annular member 22 is constantly urged upwardly away from the material 17 by a plurality of springs 47 (three shown in FIG. 3). Each of the springs 47 has one end supported on a flange 48 of the hollow cylindrical member 30 and the other end acting on an upward extension 49 of the hollow cylindrical member 29.

As shown in FIG. 3, the extensions 49 are disposed between projecting portions 49a of the hollow cylindrical member 30. A pair of pins 49b is carried by the hollow cylindrical member 29 to engage opposite sides of one of the projecting portions 49a of the member 30 to prevent rotation of the member 29 while still permitting the member 29 to slide relative to the member 30.

An annular chamber 50 is formed between the top of the hollow member 28, a wall of the hollow cylindrical member 29, the flange 48 of the hollow cylindrical member 30, and a wall of the hollow cylindrical member 30 as shown in FIG. 2. When pneumatic pressure such as air pressure, for example, is supplied to the chamber 50, the force of the springs 47 is overcome and the hollow cylindrical member 29 is moved downwardly relative to the hollow cylindrical member 30 to urge the surface of the flat portion 23 of the annular member 22 into engagement with the top of the material 17.

Air is supplied to the chamber 50 from a compressor 51 (see FIG. 5), which has its outlet connected through a flexible hose 52 to a passage 53 (see FIG. 2) in the frame 37. The passage 53 communicates with one end of a passage 54 in one of the projecting portions 49a in the hollow cylindrical member 30. The other end of the passage 54 communicates with the chamber 50. Accordingly, air from the compressor 51 is supplied into the chamber 50 to cause a downward force to be exerted by the annular member 22 on the top of the material 17.

A pressure regulating valve 55, which may be manually controlled. regulates the air pressure from the compressor 51 to the chamber 50. Thus, pulsating air pressure may be supplied to the chamber 50 through manually opening and closing the valve 55. Of course, if desired, the opening and closing of the valve 55 could be automatically controlled by a numerical control apparatus, which controls the operation of the remainder of the material cutting machine as more particularly shown and described in the aforesaid Bruns application.

The outer surface of the annular member 22 preferably is coated with a suitable material to prevent any damage to the material 17. One suitable example of this coating material is TEFLON.

Considering the operation of the present invention, the vertical position of the flat portion 23 of the annular member 22 with respect to the plane of the material supporting means on which the material 17 is to be supported is determined by the position of the frame 37 on the rods 34 and 35 or the extension rods (one shown at 45 in FIG. 4). Thus, when the total thickness of the material 17 is relatively small, the flat portion 23 of the annular member 22 will be disposed closest to the throat way sections 20 and 21 and furtherest from the housing 12. Likewise, when the total thickness of the material 17 is the largest, the flat portion 23 of the member 22 will be disposed the greatest distance from the throat way sections 20 and 21 and closest to the housing 12. In this last position, no extension rods (one shown at 45 in FIG. 4) are required.

Final adjustment of the member 22 with respect to the material 17 is made by first supplying air from the compressor 51 to the chamber 50. The valve 55 is adjusted to supply air to the chamber 50 to overcome the springs 47 and to shift the member 29 until a pointer 56 thereon is aligned with DOWN on a scale 57, which is supported by the central portion 38 of the frame 37.

The air pressure from the valve 55 is maintained to tend to hold the plate 22 in this position wherein the pointer 56 is aligned with DOWN on the scale 57. Then, the knobs 43 and 44 are turned to allow the frame 37 to be moved until the pointer 56 is aligned with SET on the scale 57. This will provide the desired movement of the member 22 with respect to the material 17 when the lay of the material 17 varies in total height due, for example, from splicing or humping at sharp turns.

With the annular member 22 properly positioned, the surface of the flat portion 23 of the member 22 rests on the top of the material 17. Thus, when additional air pressure is supplied from the compressor 51 to the chamber 50 through changing the position of the valve 55, the member 22 exerts the desired force on the material 17. This prevents the material 17 from being lifted during the cutting of the material 17 by upward movement of the cutting blade 10.

If any bunching of the material 17 should occur, the annular member 22 may move about the spherical end 27 of the hollow member 28. As a result, the movement of the member 22 about the spherical joint permits the member 22 to move with any irregularities or buckling in the material 17.

If the operator of the cutting machine determines that humping of the material is occurring and fluttering or reciprocation of the annular member 22 is desired to prevent this humping, the valve 55 may be opened and closed manually to cause reciprocation of the annular member 22 relative to the top of the material 17. Of course, if desired, the valve 55 could be controlled by the numerical control apparatus of the aforesaid Bruns application to cause reciprocation of the annular member 22 automatically.

The frequency of the reciprocation could be the same as the frequency of the motor 11, for example. In such an example, it might be most advantageous for the annular member 22 to be moved downwardly, if it is reciprocating, when the cutting blade 10 is moving upwardly. This would maintain the downward force on the material 17 when the cutting blade 10 tends to lift the material 17 during the upward movement of the cutting blade 10. The need for reciprocation depends upon a number of variables such as type of material, speed of cutting, blade sharpeners, radius of cut, and other factors; therefore, the frequency of this reciprocation also can change in phase relationship with blade reciprocation and might not be in phase as cited in the example. In some cases, it might not be necessary to reciprocate the member 22

While the hold down plate of the present invention has been described with respect to a reciprocating cutting blade of the type shown and described in the aforesaid Bruns application, it should be understood that the hold down plate of the present invention may be readily utilized with any material cutting machine having a cutting blade.

An advantage of this invention is that it insures that true cutting in each of the layers of material occurs in accordance with the desired pattern. Another advantage of this invention is that it prevents humping of material being cut.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A material cutting machine comprising:
   means to support material thereon in a substantially horizontal plane for cutting;
   cutting means to cut the material supported on said material supporting means;
   movable means adapted to move vertically relative to the top of the material;
   means having said movable means slidably mounted thereon;
   said movable means having an annular member through which said cutting means extends;
   means continuously urging said movable means away from engagement with the material;
   means to overcome said continuously urging means to move said annular member of said movable means into engagement with the top of the material to exert a downward force thereon;
   said movable means includes support means for said annular member, said support means being slidably mounted on said slidably mounting means; and
   said overcoming means comprises means to apply pneumatic pressure to said support means.

2. The material cutting machine according to claim 1 in which said continuously urging means comprises a plurality of springs acting between said slidably mounting means and said support means.

3. The material cutting machine according to claim 2 including means on said slidably mounting means and said support means to indicate the position of said support means relative to said slidably mounting means.

4. The material cutting machine according to claim 2 including means to adjust the position of said annular member relative to the top of the material in accordance with the thickness of the material.

5. The material cutting machine according to claim 1 including means to spherically mount said annular member on said support means.

6. A material cutting machine comprising:
   means to support material thereon in a substantially horizontal plane for cutting;
   cutting means to cut the material supported on said material supporting means;
   movable means adapted to move vertically relative to the top of the material;
   means having said movable means slidably mounted thereon;
   said movable means including:
      support means slidably mounted on said slidably mounting means;
      and a member spherically mounted on said support means, said member having said cutting means extending therethrough;
      means continuously urging said movable means away from engagement with the material; and
      means to overcome said continuously urging means to move said member of said movable means into engagement with the top of the material to exert a downward force thereon.

7. The material cutting machine according to claim 6 in which said continuously urging means acts on said support means.

8. The material cutting machine according to claim 6 in which said continuously urging means comprises a plurality of springs acting between said slidably mounting means and said support means.

9. The material cutting machine according to claim 8 including means on said slidably mounting means and said support means to indicate the position of said support means relative to said slidably mounting means.

10. The material cutting machine according to claim 8 including means to adjust the position of said annular member relative to the top of the material in accordance with the thickness of the material.

UNITED STATES PATENT OFFICE
CERTIFICATE OF CORRECTION

Patent No. 3,535,965      Dated October 27, 1970

Inventor(s) Herman J. Baldwin

It is certified that error appears in the above-identified patent and that said Letters Patent are hereby corrected as shown below:

In the abstract, line 12, "knife" should read -- knife. --. Column 1, lines 20 and 45, "et al.,", each occurrence, should read -- et al. --. Column 3, line 59, before "regulates" insert a comma. Column 4, line 49, after "automatically" insert a period; line 65, after "22" insert a period. Column 6, line 20, the paragraph beginning with "means" should not be indented; line 22, the paragraph beginning with "means" should not be indented.

Signed and sealed this 4th day of May, 1971.

(SEAL)
Attest:

EDWARD M. FLETCHER, JR.
Attesting Officer

WILLIAM E. SCHUYLER, JR.
Commissioner of Patents